United States Patent
Irizarry et al.

(10) Patent No.: US 11,228,525 B2
(45) Date of Patent: Jan. 18, 2022

(54) MISSION CONTEXT ROUTING DATA COMMUNICATION SYSTEM

(71) Applicant: RAYTHEON COMPANY, Waltham, MA (US)

(72) Inventors: Hector L. Irizarry, Wylie, TX (US); Karen L. Trapane, St. Petersburg, FL (US)

(73) Assignee: RAYTHEON COMPANY, Waltham, MA (US)

( * ) Notice: Subject to any disclaimer, the term of this patent is extended or adjusted under 35 U.S.C. 154(b) by 63 days.

(21) Appl. No.: 16/561,455

(22) Filed: Sep. 5, 2019

(65) Prior Publication Data

US 2021/0075717 A1 Mar. 11, 2021

(51) Int. Cl.
| | |
|---|---|
| *H04L 12/725* | (2013.01) |
| *H04L 12/707* | (2013.01) |
| *H04L 29/08* | (2006.01) |
| *H04L 12/851* | (2013.01) |
| *H04L 12/24* | (2006.01) |
| *H04W 40/02* | (2009.01) |

(52) U.S. Cl.
CPC ........ *H04L 45/302* (2013.01); *H04L 41/0668* (2013.01); *H04L 45/24* (2013.01); *H04L 47/24* (2013.01); *H04L 67/18* (2013.01); *H04W 40/02* (2013.01)

(58) Field of Classification Search
None
See application file for complete search history.

(56) References Cited

U.S. PATENT DOCUMENTS

| | | | |
|---|---|---|---|
| 7,020,087 B2 | 3/2006 | Steinberg et al. | |
| 8,224,931 B1 | 7/2012 | Brandwine et al. | |
| 8,874,719 B1 | 10/2014 | Burnett et al. | |
| 9,960,958 B2 | 5/2018 | Ramachandran et al. | |
| 10,498,651 B1 * | 12/2019 | Cothran | H04L 45/02 |
| 2002/0018449 A1 | 2/2002 | Riccuilli | |
| 2007/0153763 A1 * | 7/2007 | Rampolla | H04L 45/28 370/351 |
| 2013/0250955 A1 * | 9/2013 | Wang | H04L 45/54 370/392 |
| 2015/0304934 A1 * | 10/2015 | Malatack | H04L 41/5051 455/552.1 |

FOREIGN PATENT DOCUMENTS

CN    107078921 A    8/2017

* cited by examiner

*Primary Examiner* — Ajit Patel
*Assistant Examiner* — Keith Follansbee
(74) *Attorney, Agent, or Firm* — Cantor Colburn LLP (57) ABSTRACT

A data communication system includes a host computing system, a data communication network, and a mission context routing (MCR) system. The host computing system is configured to receive a user request to exchange data between the host computing system and a destination communication device. The data communication network is configured to establish at least one network path to facilitate data exchange between the host computing system and the destination communication device. The MCR system is configured to determine route connection data based on an input selected from a group that includes the user request in context of the activity a user is performing, and an operational context of a network owner entity. Accordingly, the MCR system establishes a designated network path among a plurality of different available network paths of the data communication network based at least in part on the route connection data.

16 Claims, 9 Drawing Sheets

MISSION CONTEXT ROUTING DATA COMMUNICATION SYSTEM

BACKGROUND

The present invention relates to data communications systems, and more specifically, to a system and method to control data output and routing in a data communication system.

Traditional data communication systems route data based on network congestion, desired data throughput, and/or network node functionality. Factors controlling the routing of data is typically focused on internal factors such as a faulty node or host system performance. In some systems, data is routed to achieve increased bandwidth to support data throughput performance improvements.

SUMMARY

According to a non-limiting embodiment, a data communication system includes a host computing system, a data communication network, and a mission context routing (MCR). The host computing system is configured to receive a user request to exchange data between the host computing system and a destination communication device. The data communication network is configured to establish at least one network path to facilitate data exchange between the host computing system and the destination communication device. The MCR system is configured to determine route connection data based on an input selected from a group that includes the user request in context of the activity a user is performing, and an operational context of a network owner entity. The MCR system establishes a designated network path among a plurality of different available network paths of the data communication network based at least in part on the route connection data.

According to another non-limiting embodiment, a mission context routing (MCR) system comprises an MCR task controller in signal communication with a host computing system. The MCR task controller is configured to receive a user request to connect to a data communications network having a plurality of different available network paths, and to determine one or both of host context information and a task corresponding to the user request. The MCR system further comprises an MCR route controller in signal communication with the MCR task controller and the data communications network. The MCR route controller is configured to generate route connection data based on one or both of the host context information and the task. The MCR task controller receives the route connection data and configures a designated network path among the plurality of different available network paths based on the route connection data.

According to yet another non-limiting embodiment, a method of routing data through a data communications network comprises receiving, by an MCR task controller, a user request to connect to a data communications network having a plurality of different available network paths, and determining, by the MCR controller, one or both of a host context information and a task corresponding to the user request. The method further comprises generating, by a MCR route controller, route connection data based on one or both of the host context information and the task; and receiving, by the MCR task controller, the route connection data and configuring a designated network path among the plurality of different available network paths based on the route connection data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are relevant to the inventive teachings described herein, traditional data communication systems control data routing based on faulty node or targeted bandwidth without considering multiple factors that are external to the data communication network. For instance, known data communication systems may actively configure data routing based on internal factors such as data congestion or data throughput regardless as to an entity or node at which the data is routed through, or a user attempting to output data from the host system on to the data network.

Various non-limiting embodiments described herein provide a data communication system that employs a mission context routing (MCR) system configured to actively control data routing and/or data output based on multiple factors external to the data network. In one or more non-limiting embodiments, the MCR system allows organizations or clients to control network traffic routing decisions based on mission concerns and/or the risk that confidential data may be exposed to an unauthorized entity or adversary. To avoid the risk of exposure, the MCR system can actively reconfigure one or more data paths to divert the data away from targeted adversaries or identified geographical areas.

In another non-limiting embodiment, the MCR system can analyze client identity (ID) information (e.g., a user or a machine) and unit of work (e.g., work task) as an external factor. Based on the client (ID) information and/or unit of work, the MCR system can actively control the data output from the host system and/or the routing of data from the host system to a desired endpoint.

Figure 1:
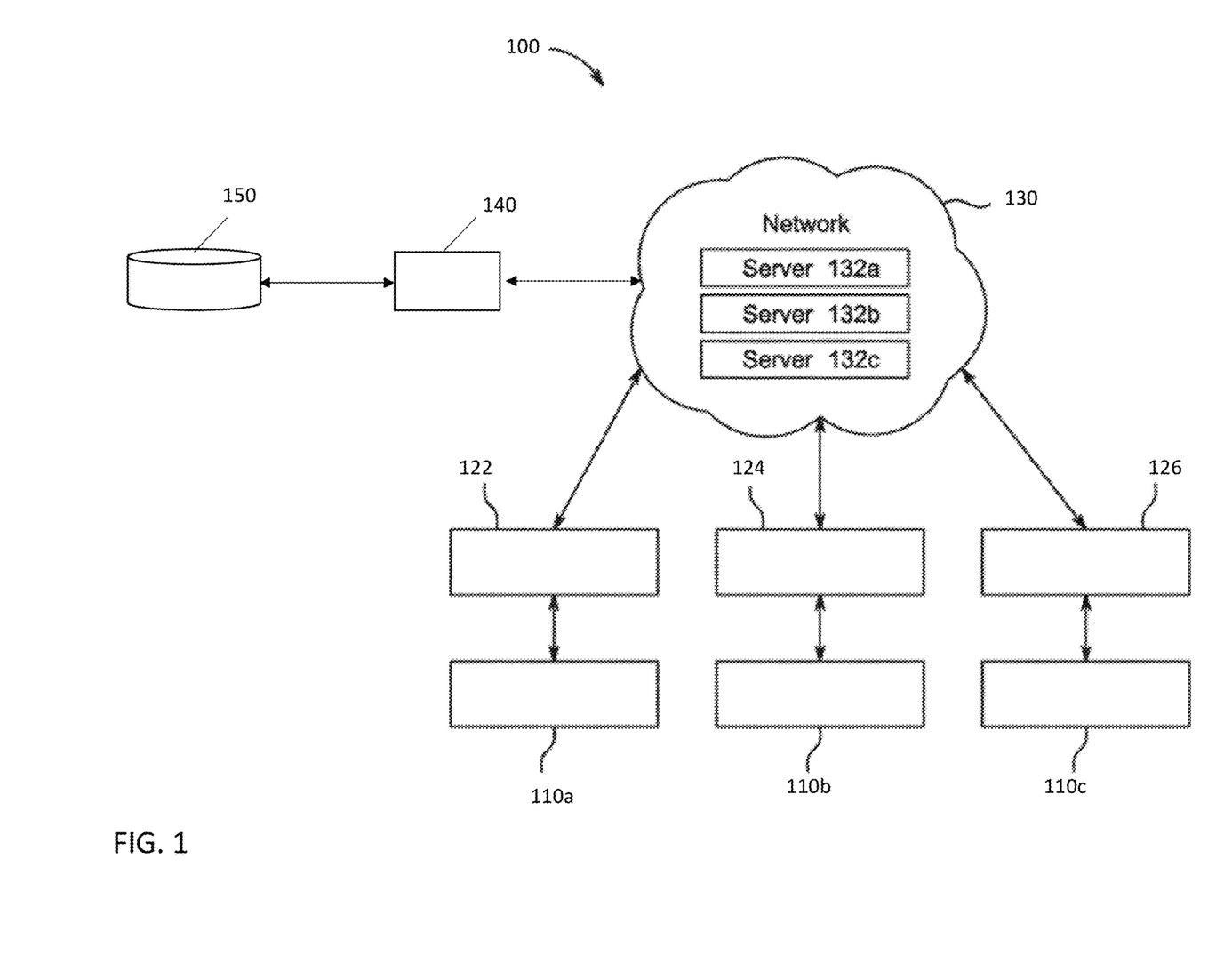
FIG. 1 is a block diagram illustrating a communication system according to a non-limiting embodiment.

With reference now to FIG. 1, a communication system 100 is illustrated according to a non-limiting embodiment. The communication system includes communication devices 110a, 110b and 110c. Examples of communication devices 110a, 110b and 110c include, but are not limited to, client workstations such as desktop computers, along with mobile devices such as portable handsets, smartphones, tablet computers, laptop computers, wearable devices, and sensors. The communication devices 110a, 110b, 110c obtain cloud services using cloud servers 132a, 132b, 132c in the network 130. The communication devices 110a, 110b and 110c can communicate with the network 130 wirelessly, through a base station (BS) 122, or through a wired (or wireless) access point (AP) 124, or router 126. The BS 122 or the AP 124 may include an evolved NodeB (eNB). The communication devices 110a, 110b and 110c can communicate using any of a number of different local communication techniques, such as WiFi, Bluetooth or Zigbee, among others and/or remote communication techniques with the network 130 via Third Generation Partnership Project Long Term Evolution (3GPP LTE) networks and LTE advanced (LTE-A) networks, 4th generation (4G) networks, 5th generation (5G) networks, or any future generation network protocol. The cloud servers 132a, 132b, 132c can store various data such as routing tables and can provide audio and/or video content. The cloud servers 132a, 132b, 132c can also provide processing or support for applications running on the communication devices 110a, 110b, and 110c.

The communication system 100 can further include one or more local servers 140 in signal communication with a data repository 150. The local server 140 and/or the cloud servers 132a, 132b, and 132c can provide processing capabilities to receive, test, and report on a template, as described in more detail below. The data repository 150 stores data for use by the server in receiving, testing, and reporting on the template. According to some examples, the data repository 150 may be a database configured to store various algorithms and data analysis models allowing for real-time predictive analysis, artificial intelligence operations, and machine learning techniques.

As used herein, the phrase "cloud services" encompasses its plain and ordinary meaning. A cloud service may include any resource that is provided over a network, such as the Internet. According to some examples, cloud services may include, among other things, software as a service (SaaS), platform as a service (PaaS), and infrastructure as a service (IaaS). Cloud services provided by the cloud network 130 can also include data server and database management services.

Some capabilities of the subject technology address the problem in the computer arts of determining a state of an information technology (IT) environment, where the IT environment is virtualized and cloud-based. The state may include information about compliance with a security policy or a resource usage policy, information about changes to the IT environment, user profiles, security clearance levels associated with user profiles or a given communication device 110a, 110b, 110c, data exchange and/or website access priorities associated with a respective user profile or communication device 110a, 110b, 110c, or other user-provided queries about the IT environment.

According to some implementations, the solution to the problem of determining the state of the IT environment includes accessing an infrastructure-as-code (IaC) template for the IT environment. The solution also includes deconstructing, using a parser for the IaC template, the IaC template to a graph database representation of the IT environment. The graph database representation implements a predefined cloud resource ontology (CRO), as discussed in greater detail below. The solution also includes determining, using the graph database representation, the state of the IT environment. The determined state of the IT environment may be provided as a digital transmission, for example, via email, push notification, short messaging service (SMS), web browser or other application, and the like. According to some implementations, the solution above is implemented at the server 140. The IT environment includes the servers 132a, 132b, and 132c of the network 130 and any virtualized and cloud-based data residing thereon.

Figure 2:
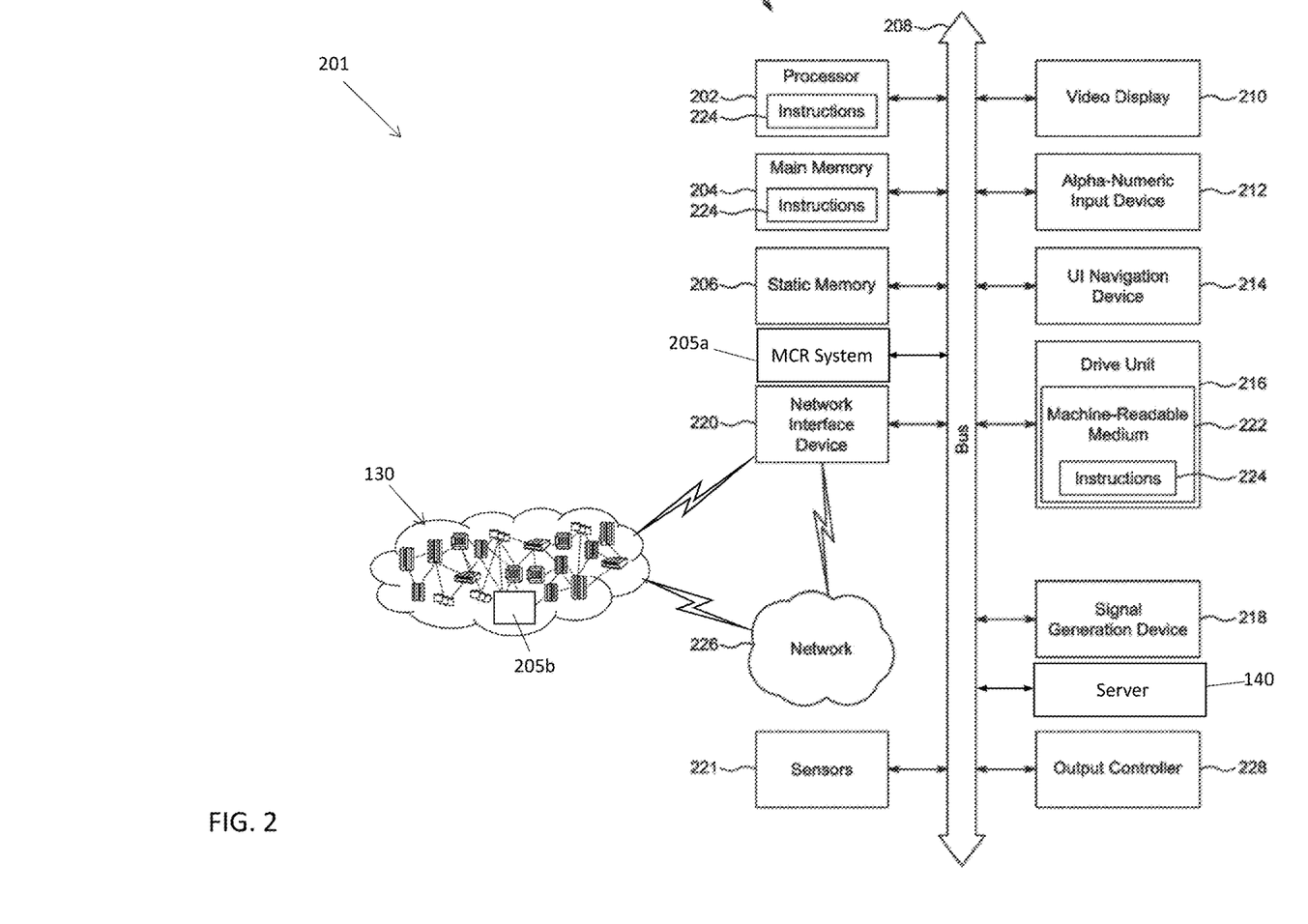
FIG. 2 is a block diagram of illustrating a data communication system including a mission context routing (MCR) system according to a non-limiting embodiment.

Referring to FIG. 2, a block diagram of a data communication system 201 is illustrated according to a non-limiting embodiment. The data communication system includes a computing system 200 in signal communication with a cloud computing network 130 and a data communications network 226. The computing system 200 can be installed in a client/host network and can include, or can operate on, logic and/or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing system 200 includes a hardware processor 202 (e.g., a central processing unit (CPU), a GPU, a hardware processor core, or any combination thereof), memory 204 and a static memory 206, some or all of which may communicate with each other via an interlink (e.g., bus) 208. Although not shown, the main memory 204 may contain any or all of removable storage and non-removable storage, volatile memory or non-volatile memory. The computing system 200 can further include a video display unit 210 (or other display unit), an alphanumeric input device 212 (e.g., a keyboard), and a user interface (UI) navigation device 214 (e.g., a mouse). In an example, the display unit 210, input device 212 and UI navigation device 214 may be a touch screen display. The computing system 200 can additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The computing system 200 can include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 216 (e.g., a storage device) may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the computing system 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media e.g., a centralized or distributed database, and/or associated caches and servers) configured to store the one or more instructions 224. The term "machine readable medium" can include any medium that is capable of storing, encoding, or carrying instructions for execution by the computing system 200 and that cause the computing system 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over the communications network 226 using a transmission medium via the network interface device 220 using any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226.

The data communication system 201 further includes a local MCR system 205a and/or a cloud-based MCR system 205b. The local MCR system 205a is in signal communication with the local bus 208, and establishes signal communication with the cloud network 130 and communications network 226 via the network interface device 220. The cloud-based MCR system 205b is in signal communication with the communications network 226 and establishes signal communication with the computing system 200 (e.g., the bus 208) via the network interface device 220.

In one or more embodiments, the MCR system 205a/205b is configured to control network traffic routing decisions based on factors external to the data communications network 201. For example, the MCR system 205a/205 is capable of executing routing decisions based on mission concerns and allows control of data risk exposure by avoiding routing to certain geographical areas. For example, the MCR system 205a/205b can actively monitor external factors such as adversary node locations and current foreign affairs status and actively reconfigure data routes to avoid routing sensitive/critical information through high risk or compromised nodes. The MCR system 205a/205b can also analyze external factors to control attribution, avoid counter measures, and perform resource load balancing.

In terms of commercial-related applications, the MCR system 205a/205b can actively control data routing based on business factors has innumerable applications on the Internet landscape without network neutrality ("Netneutrality") regulations, from routing premium customers through better networks routes, prioritizing traffic to critical systems, along with providing controlled access to external computing resources such as commercial cloud access.

When implemented in business or corporation networking environments, the MCR system 205a/205b can control data exchange between business/corporation client network to the external network based on user ID profiles, computer or communication device IDs, data type and/or data context.

Figure 3:
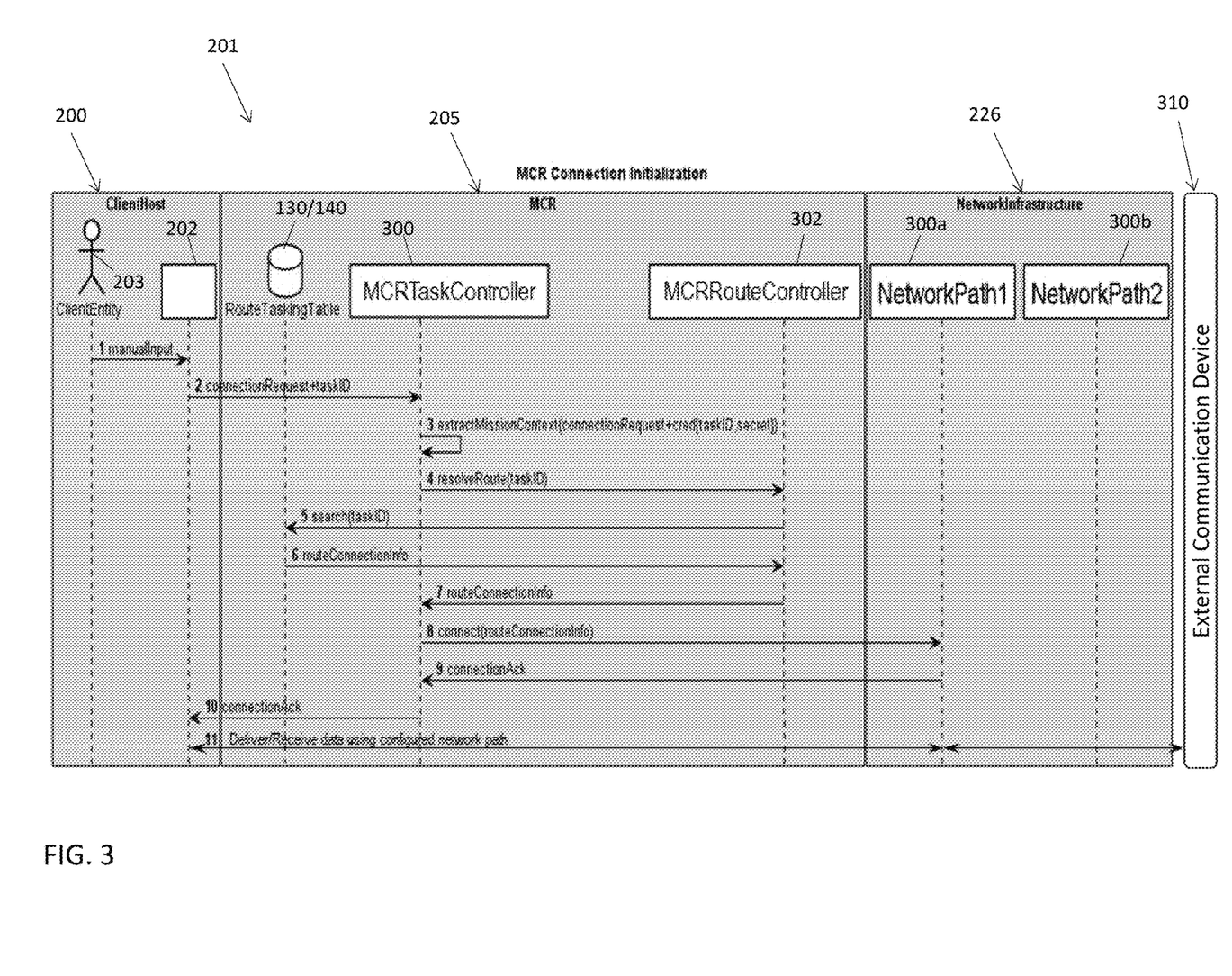
FIG. 3 depicts a MCR system in signal communication with a host system and an external data network according to a non-limiting embodiment.

Turning now to FIG. 3, an MCR system 205 is shown in signal communication with a host computing system 200 and an external data communications network 226 according to a non-limiting embodiment. The MCR system 205 can monitor external network factors and perform analysis and analytics to actively control data routing between a host computing system 200 and the external data network 226 and/or to actively reconfigure routing data network paths 300a, 300b, 300n included in the external data network 226.

The MCR system 205 includes an MCR task controller 300 and an MCR route controller 302. The MCR task controller 300 is in signal communication with the host computing system 200, a cloud database 130 and/or server database 140 (referred to herein as a database 130/140), and the MCR route controller 302. The database 130/140 stores route connection data and host context information. The route connection data includes a plurality of predefined routing tables that are each indexed by a pre-assigned task ID. Each predefined routing table defines an available network path of the data communication network. The database can also store various external factors such as current adversaries and locations of adversary nodes, which allow the MCR system 205 to actively generate a routing table that takes into account nodes associated with or controlled by adversaries.

The host context information includes, for example, a user ID, a device ID, geographic location, and system role. The user ID can include a username or other identifier, which the user 203 enters in order to access the host computing system 200. The device ID can include a device serial number or other identifier associated with the host communication device (e.g., processor 202) that is outputting the user request to the MCR task controller 300. The host ID and/or the device ID can be automatically embedded in each user request, which can then be extracted by the MCR task controller 300. The host ID and/or the device ID can be assigned one or more routing permissions that set a level of data access between the host computing system 200 and an external communication device 310 in signal communication with the communications network 226. The permission can also indicate data exchange rates (e.g., upload/download data rates, data routing speeds, data streaming rates, etc.) from one user/device to another. The permissions can be assigned, for example, by an organization internal information technology (IT) department based on a variety of internal factors such as security clearance levels, conflicts of interest, etc.

The MCR task controller 300 is configured to receive a user request to connect to the external data communications 226. In one or more embodiments, the user request can be input by a user 203 via processor 202 installed in the host computing system 200. The external data communications network 226 has a plurality of different available network paths capable of exchanging data between the host computing system 200 and one or more remotely located communication devices 310. In one or more embodiments, the external communication device 310 is located at a geographical location different from the host computing system 200.

The MCR task controller 300 is configured to analyze the user request and extract a host identifier (ID) and/or one or more tasks therefrom. The tasks include, for example, attributes that enable correlation with other enterprise information. The attributes include, but are not limited to, host IP address, destination IP address, initiation timestamp, communication protocols, user ID, and task ID. Using the host IP address allows for looking up the host records and can allow for generating a host context (host ID, IP address, configuration, geographical location, system role). Using the user ID allows for looking up the user's role(s) or privileges for validating against one or more task constraints. The task ID is associated with a request within temporal, geographic, target, or execution bounds of task, and can be viewed as a request using the expected protocol to point to the expected destination.

In at least one non-limiting embodiment, the MCR task controller 300 is configured to analyze the user request to determine its context, and then generate task identification (ID) information indicating the user's intended task associated with the user's request to access the external data network 226 based at least in part on the determined context. In one or more embodiments, the MCR task controller 300 can perform various known word recognition operations, for example, on the user request to determine keywords indicative of the context task(s) associated with the user request. In response to determining the task, the MCR task controller 300 can generate a task ID indicating the determined task associated with the user request. In at least one non-limiting embodiment, the MCR route controller 302 receives the task ID, compares it to the plurality of predefined routing tables stored in the database 130/140 and/or data exchange parameters (e.g., authorized data routing speeds, etc.), and generates the route connection data based on a selected predefined routing table having a predefined task ID that matches the task ID determined by the MCR task controller.

Figure 4:
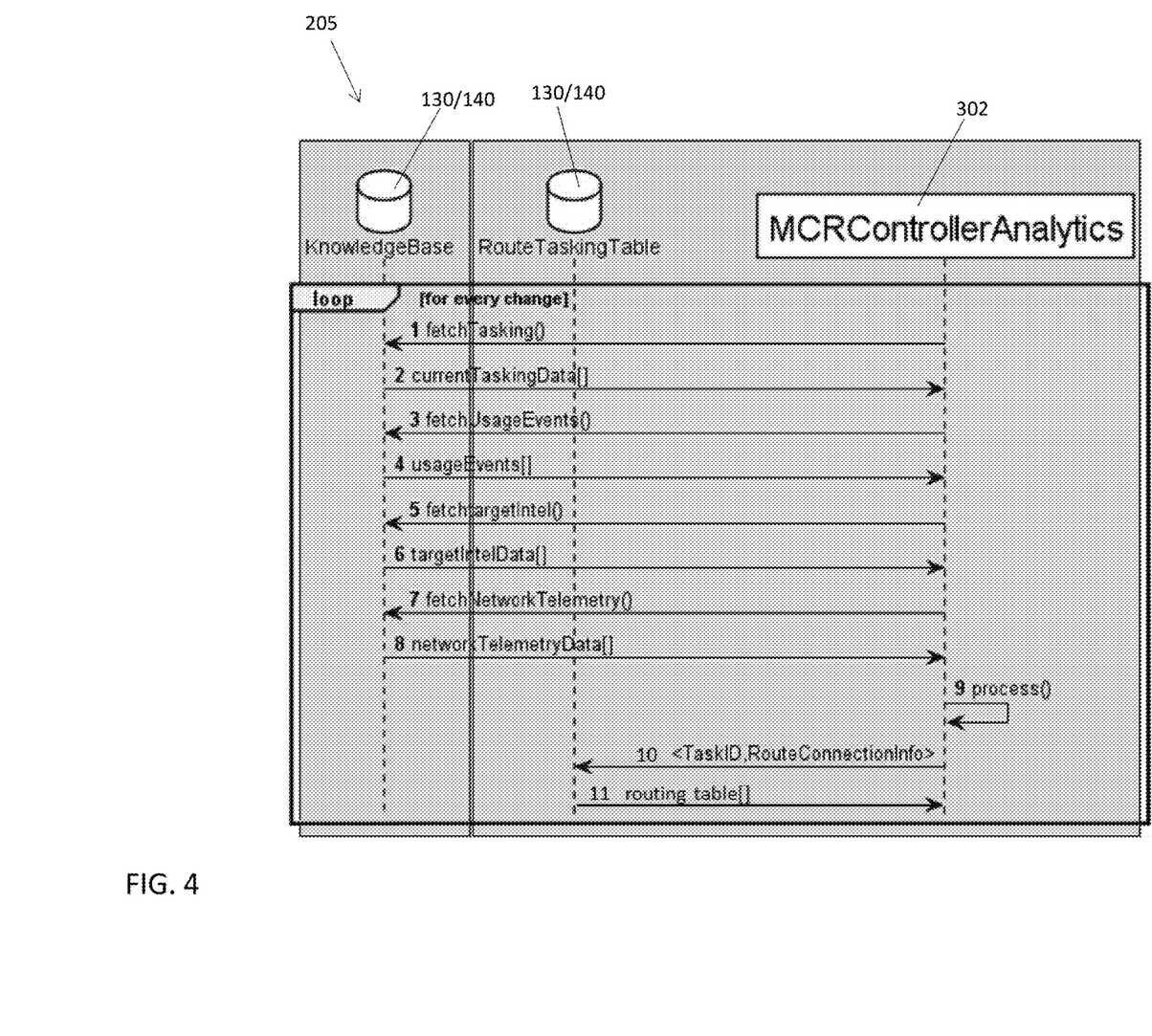
FIG. 4 depicts a diagram of a data routing analysis performed by an MCR controller included in an MCR system according to a non-limiting embodiment.

In one or more embodiments, the MCR route controller 302 can perform a series of data analytics to determine the selected predefined routing table. As shown in FIG. 4, for example, the MCR route controller 302 can fetch a task from the knowledge data base 130/140 based on an input selected from a group comprising the user request, a context of the activity a user is performing, and an operational context of a network owner entity. The MCR route controller 302 can then analyze the fetched task and fetch a usage event from the knowledge data base 130/140. The MCR route controller 302 can then analyze the fetched usage event and obtain target inlet data from the knowledge data base 130/140. The MCR route controller 302 can then analyze the target inlet data and fetch network telemetry data from the knowledge data base 130/140. Based on the network telemetry data, the MCR route controller 302 can determine a taskID and route connection information, and obtain a routing table from the database 130/140.

Referring again to FIG. 3, the MCR route controller 302 is in signal communication with the MCR task controller 300 and the data communications network 226. The MCR route controller 302 is configured to determine route connection data based on an input selected from a group comprising the user request, a context of the activity a user is performing, an operational context of a network owner entity the host ID, and the determined task(s). The route connection data includes, but is not limited to, routing schemes, routing tables, node hopping schedules for routing data through the data communications network, permitted/non-permitted websites, permitted/non-permitted email addresses, permitted/non-permitted computing devices, data exchange rate speeds, data routing speeds, etc.

In at least one non-limiting embodiment, the MCR route controller 302 receives the route connection data and actively configures a designated network path among the plurality of different available network paths based on the route connection data. Accordingly, data is exchanged between the host computing system 200 and a destination communication device 310 using the designated network path. For example, data can be routed from the host computing system 200 to one or more destination devices 310 according to a sequence of node hops defined by the selected routing table associated with the determined task ID.

Figure 5A:
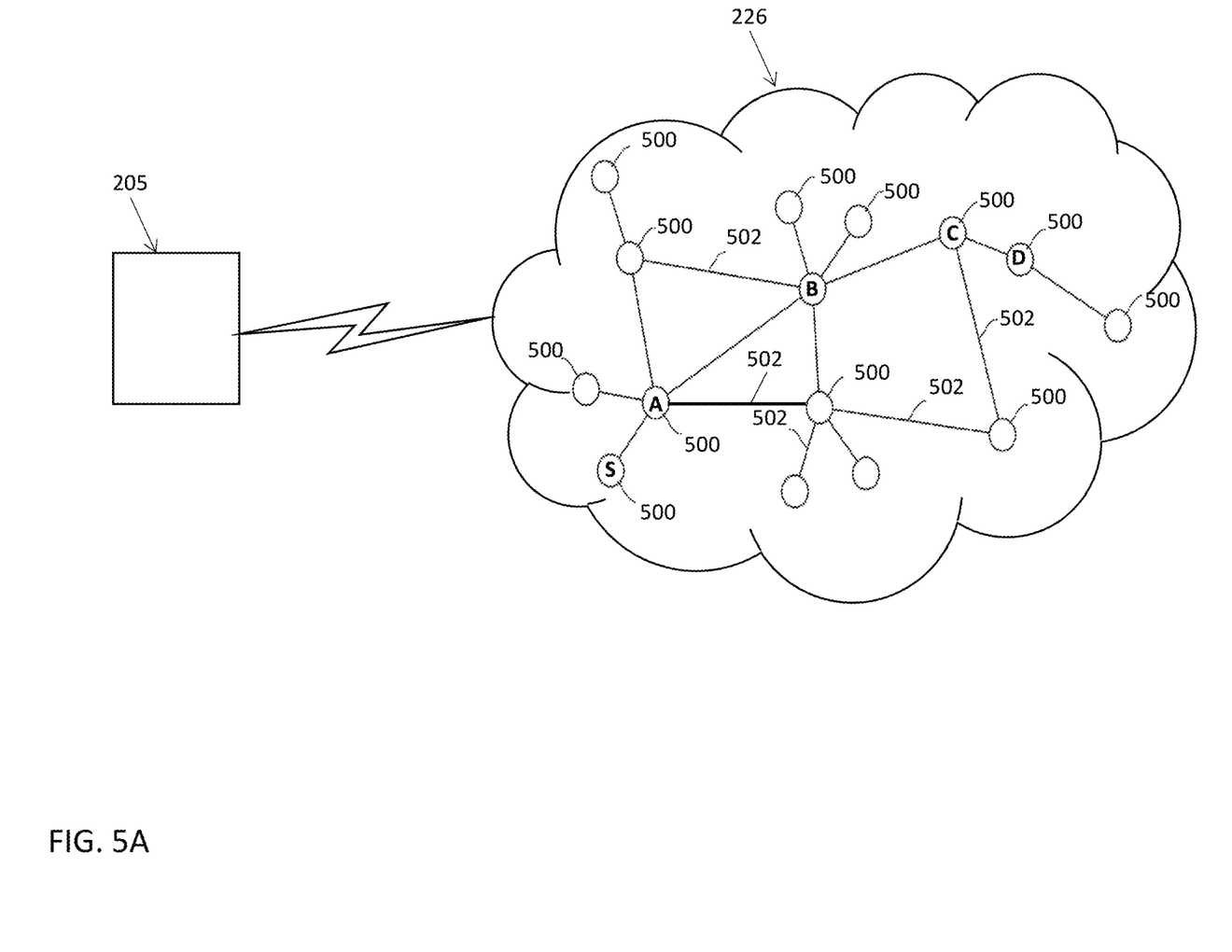
FIG. 5A depicts a first designated network data route selected by an MCR system according to a non-limiting embodiment.
Figure 5B:
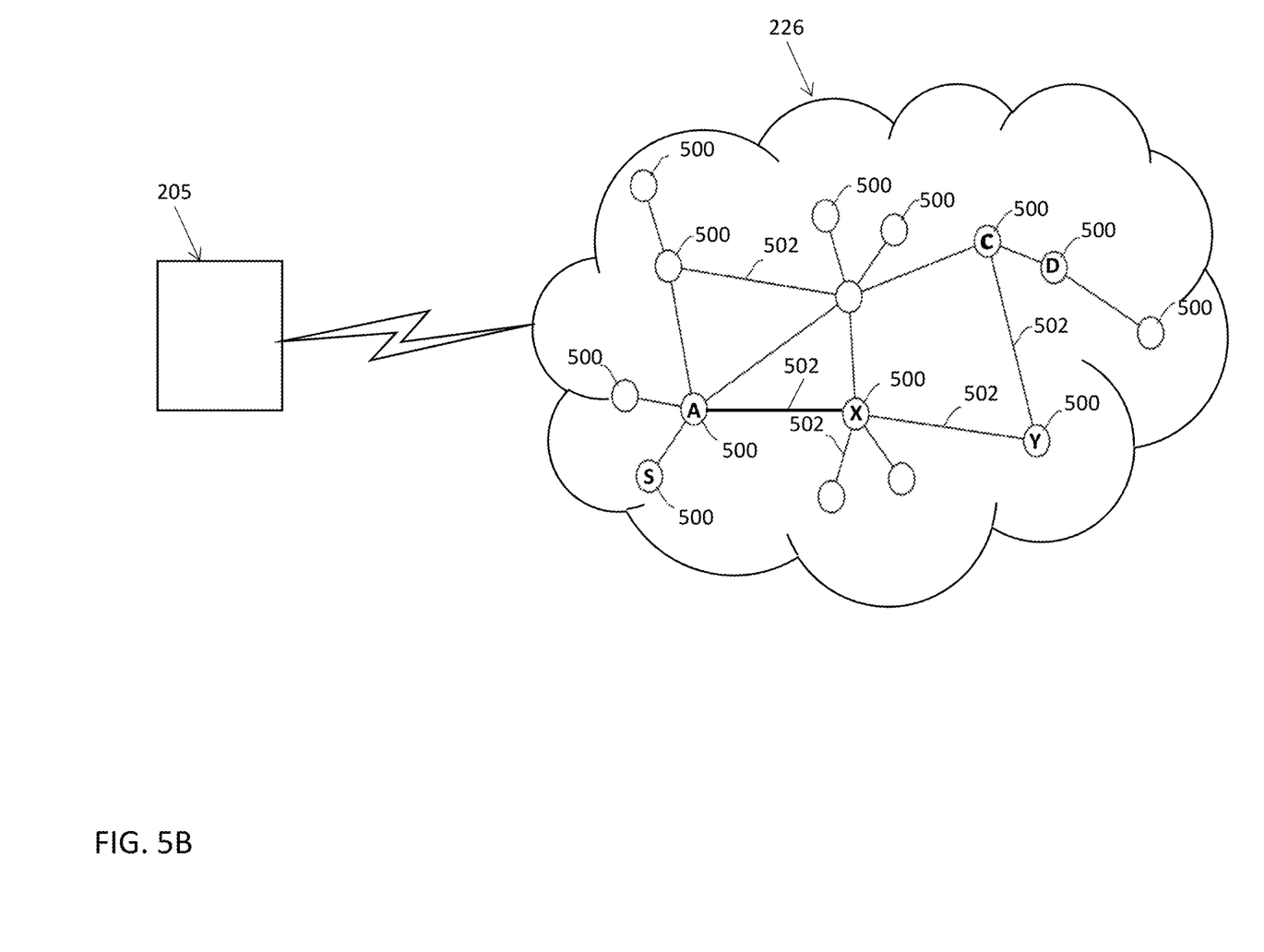
FIG. 5B depicts a second designated network data route actively transitioned from the first designated network data route by the MCR system according to a non-limiting embodiment.

As shown in FIG. 5A, for example, a data communications network 226 includes a plurality of nodes 500. The path between a pair of nodes 500 can be referred to as segment 502. The various combination of nodes 500 and segments 502 defines one or more available network paths of the data communications network 226. A first designated network path is shown for routing through the data communications network. The first designated network path can begin at a source node (S) and data is routed through intermediate nodes A, B, and C before reaching its destination node (D). Referring to FIG. 5B, the MCR task controller 300 determines a new task of a subsequent user request, which includes exchanging confidential data using node (B), which is associated or controlled by an adversary. Accordingly, the MCR route controller 302 determines that the data should avoid node (B), and a second designated network path is configured for routing the data from the source node (S) to the destination node (D). In this case, the second designated network path includes intervening nodes A, X, Y, C, which avoids node (B) controlled by the adversary. In one or more embodiments, a predefined routing table having a predefined task ID that matches the second task ID can define a routing path that excludes nodes associated with one or more known adversaries. The MCR route controller 302 can also actively generate a routing table that excludes nodes associated with one or more currently known adversaries. In this manner, the MCR task controller 300 configures the second designated network path including nodes S, A, X, Y, C, D such that the MCR system 205 can actively reconfigure one or more data paths to divert the data away from targeted adversaries or identified geographical areas based on factors external to the data communications network 226.

Figure 6:
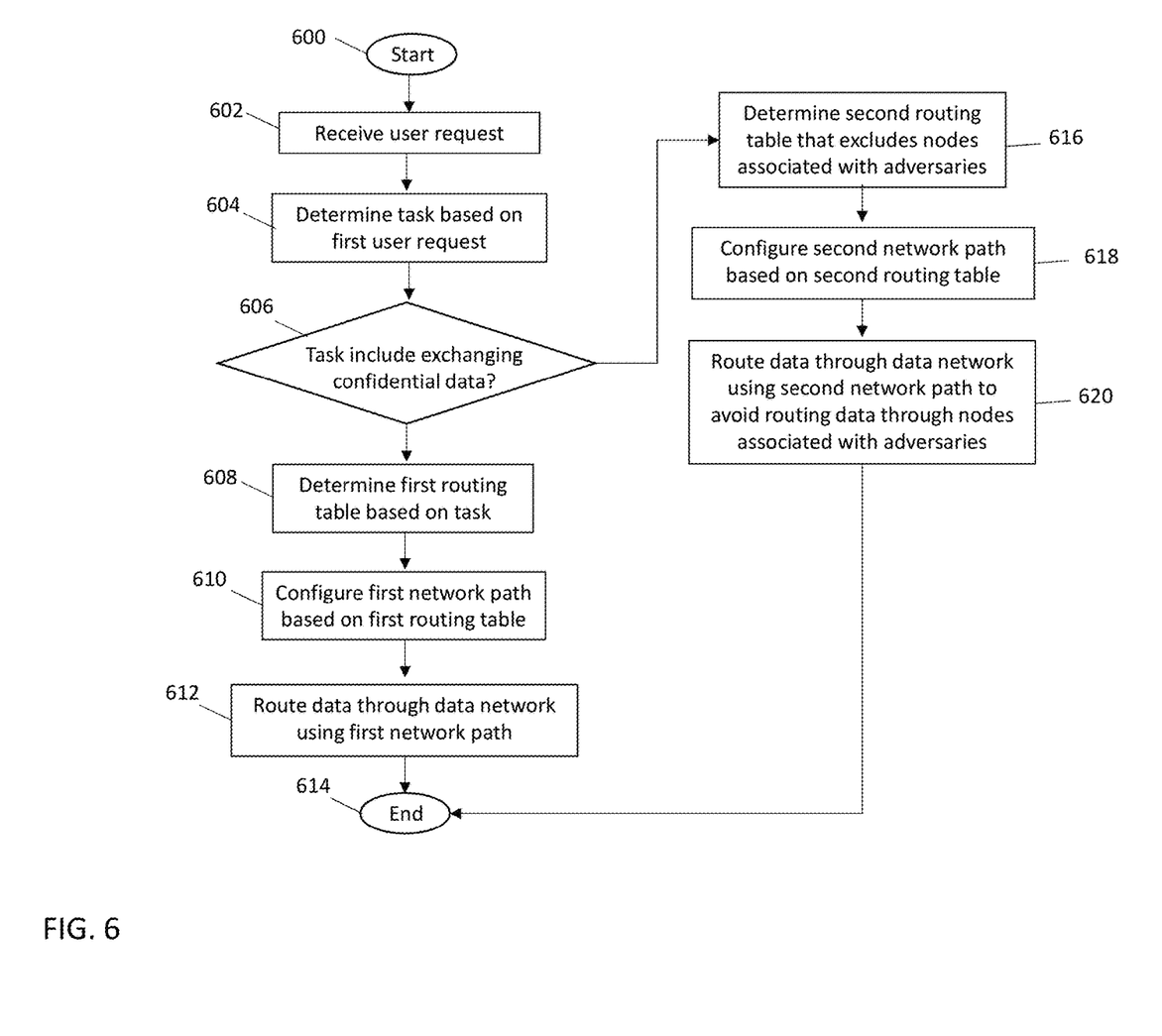
FIG. 6 depicts a flow diagram illustrating a method of actively configuring a network data route according to a non-limiting embodiment.

Referring to FIG. 6, a method of actively configuring a network data path by the MCR system 205 is illustrated according to a non-limiting embodiment. The method begins at operation 600, and at operation 602 the MCR task controller 300 of the MCR system 205 receives a user request. At operation 604, the MCR task controller 300 determines an intended task of the user 203 based on the user request. At operation 606, the MCR task controller 300 determines whether the task includes exchanging confidential data with a destination node or destination communication device 310. In one or more embodiments, the MCR task controller 300 can generate a first task ID, for example, indicating a request to exchange non-confidential data.

At operation 608, the task route controller 302 obtains the task ID from the MCR task controller 300, and compares the task ID to a plurality of predefined routing tables that are each indexed by a pre-assigned task ID. At operation 610, the task route controller 302 configures a first network path of the data communications network 226. The first data communications network 226 includes, for example, a first group routing nodes for exchanging data between a source node and a destination node or destination communication device 310. At operation 612, data is routed through the data communications network 226 according to the first network path, and the method ends at operation 614.

When, however, the MCR task controller 300 determines that the task includes exchanging confidential data with a destination node or destination communication device 310 at operation 606, the MCR task controller 300 can generate a second task ID indicating a request to exchange confidential data. Accordingly, at operation 616 the MCR routing controller 302 obtains the second task ID from the MCR task controller 300, and compares the task ID to the plurality of predefined routing tables to determine a second routing table. In one or more embodiments, a predefined routing table having a predefined task ID that matches the second task ID can define a routing path that excludes nodes associated with one or more known adversaries. The MCR routing controller 302 can also actively generate a routing table that excludes nodes associated with one or more currently known adversaries.

At operation 618, the second network path is configured based on the second routing table. Accordingly, at operation 620 data is routed through the data communications network 226 according to the second network path such that data is exchanged between a source node and a destination node while avoiding exposure to adversaries, and the method ends at operation 614.

Referring again to FIG. 3, the task route controller 302 can also actively configure a designated network path to prevent the host computing system 200 from exchanging data with a remotely located communication device 310 based on the permissions associated with the user ID and/or the device ID. In this manner, the MCR system 205 can use client identity (user IDs and/or device IDs) and/or units of work (extract task or context information from a user request) as an external factor to actively control the routing of data through the data communications network 226.

Figure 7A:
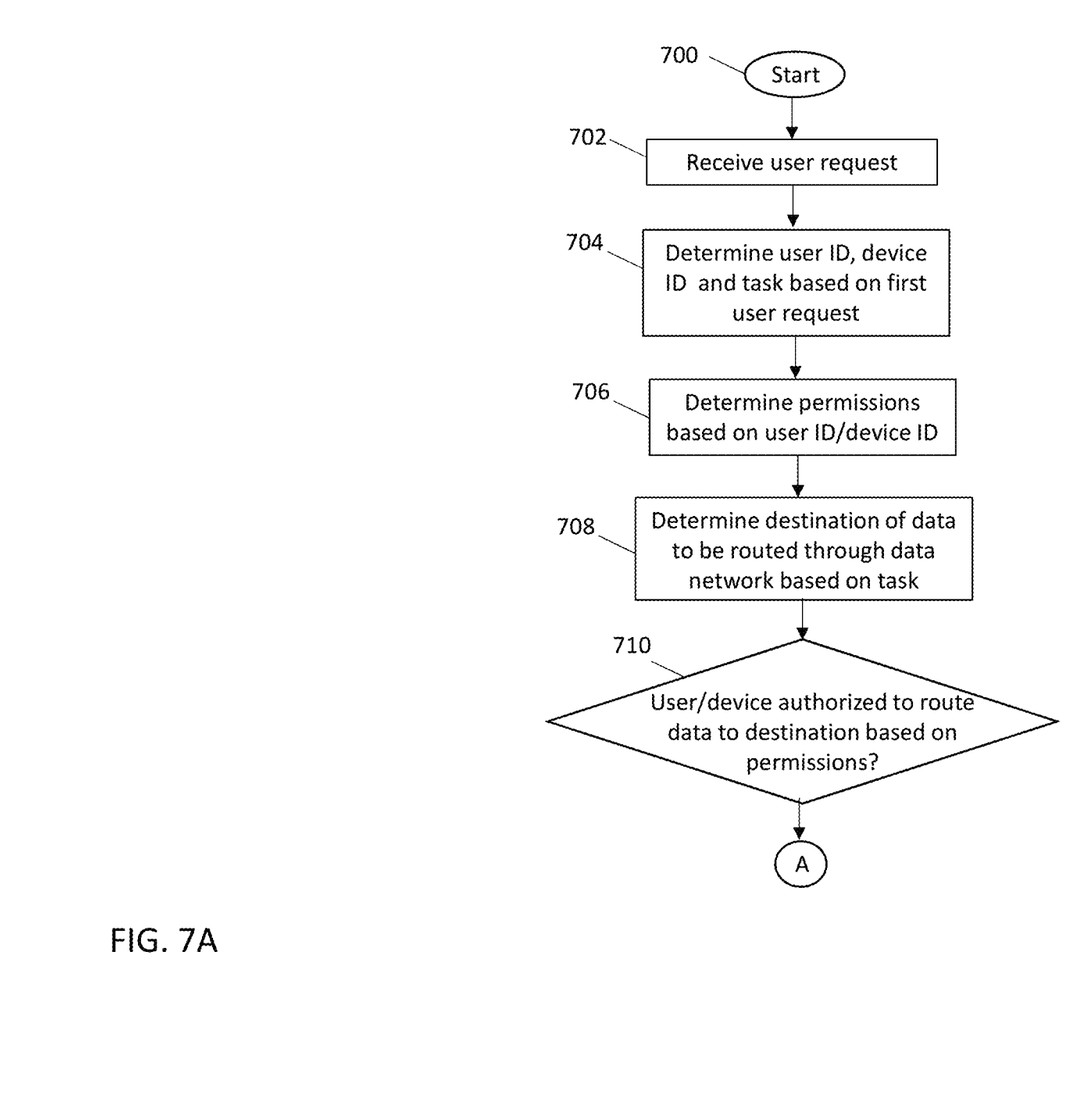
FIGS. 7A-7B depict a flow diagram illustrating a method of routing data output from a host system by an MCR system based on a user profile according to a non-limiting embodiment.
Figure 7B:
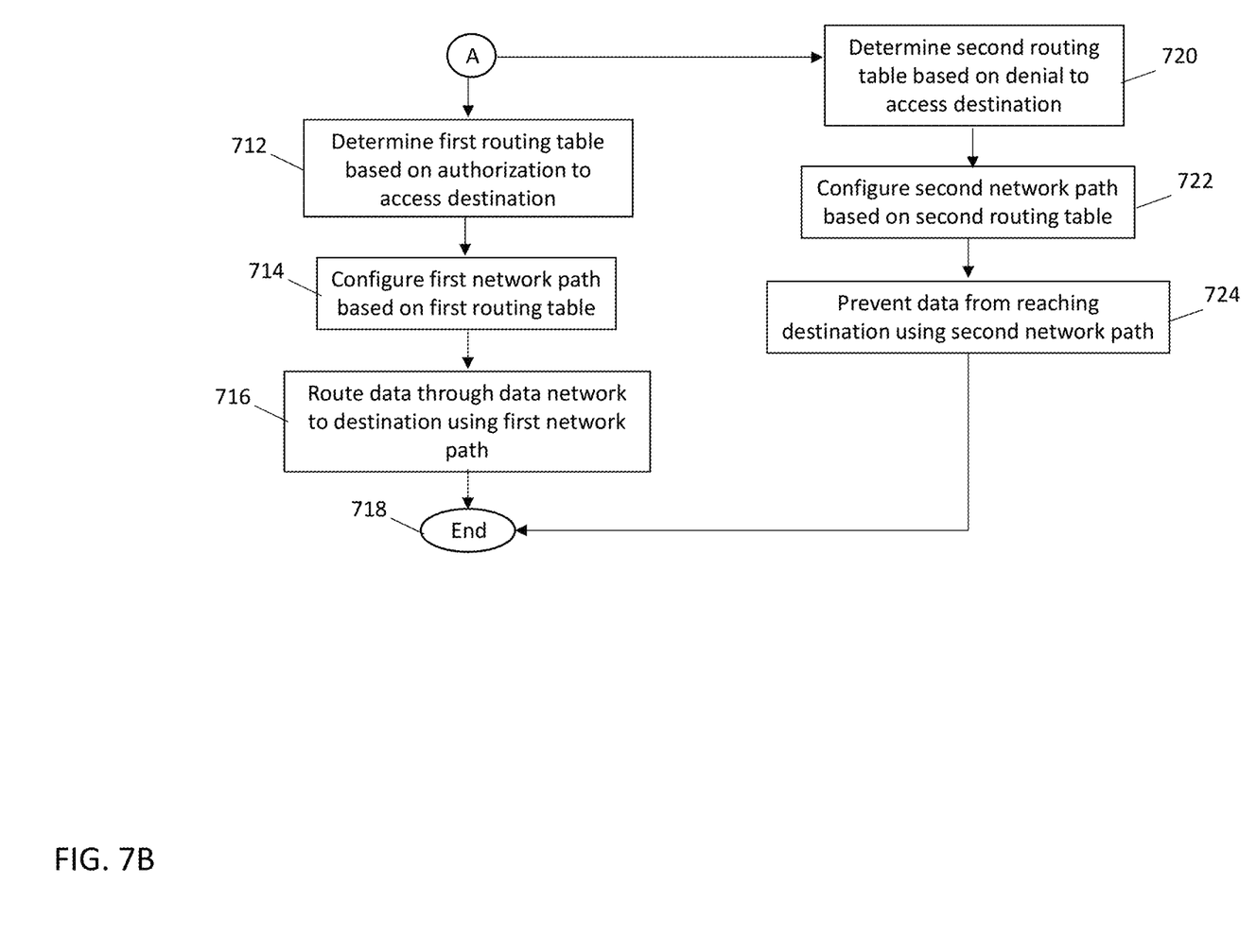

With reference to FIGS. 7A and 7B, a method of routing data output from a host system by an MCR system based on a user profile is illustrated according to a non-limiting embodiment. The method begins at operation 700, and at operation 702 the MCR task controller 300 of the MCR system 205 receives a user request. Based on the user request, the MCR task controller 300 determines an intended task of the user 203, a user ID associated with the user 203 and/or a device ID associated with the host system 200 at operation 704.

At operation 706, the permissions associated with the user ID and/or device ID can be determined. In at least one non-limiting embodiment, the user ID and/or device ID can be stored in the database 130/140 and associated with one or more permissions. The permissions can be assigned, for example, by an organization's internal information technology (IT) department based on a variety of internal factors such as security clearance levels, conflicts of interest, data exchange rates, etc. At operation 708, a destination node or destination device 310 of which the user intends to exchange data is determined. In one or more embodiments, the task extracted from the user request indicates the intended destination of the data exchange.

At operation 710, a determination is made as whether the user is authorized to exchange data with the destination node or destination communication device 310. In one or more embodiments, the determination is based on the permissions associated with the user 203. When the user 203 is authorized to exchange data with the destination node or destination device 310, the MCR route controller 302 can determine a first routing table that defines a routing path allowing the user 203 to exchange data between the host computing system 200 and a destination node or destination communication device 310 at operation 712 (see FIG. 7B). In one or more embodiments, the routing table can be pre-defined and obtained from the database 130/140 and/or can actively generate a routing table that includes nodes facilitating the data exchange between the host computing system 200 and a destination node or destination device 310. At operation 714, a first network path is configured based on the first routing table. Accordingly, data is routed through the data network 226 based on the first network path to allow the user to exchange data with the destination node or destination device 310 at operation 716, and the method ends at operation 718.

When, however, the user 203 is not authorized to exchange data with the destination node or destination device 310 at operation 710, the MCR route controller 302 determines a second routing table that defines a routing path that prevents the user 203 from exchanging data between the host computing system 200 and the destination node or destination communication device 310 at operation 720 (see FIG. 7B). Accordingly, a second network path of the data network 226 is configured at operation 722 such that data is prevented from reaching the desired destination node or destination communication device 310 at operation 724, and the method ends at operation 718.

As described herein, various non-limiting embodiments provide a data communication system that employs a mission context routing (MCR) system configured to actively control data routing and/or data output based on multiple factors external to the data network. In one or more non-limiting embodiments, the MCR system allows organizations or clients to control network traffic routing decisions based on mission concerns and/or the risk that confidential data may be exposed to an unauthorized entity or adversary. In other embodiments, the MCR system can analyze client identity (ID) information (e.g., a user or a machine) and unit of work (e.g., work task) as an external factor. Based on the client (ID) information and/or unit of work, the MCR system can actively control the data output from the host system and/or the routing of data from the host system to a desired endpoint.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. A data communication system comprising:
a host computing system configured to receive a user request to exchange data between the host computing system and a destination communication device;
a data communication network configured to establish at least one network path defined by a plurality of data nodes to facilitate data exchange between the host computing system and the destination communication device;
a mission context routing (MCR) system configured to receive the user request from the host computing system, and prior to establishing a designated network path determine route connection data based on an input selected from a group comprising the user request, a context of the activity a user is performing, and an operational context of a network owner entity, and configured to establish, after determining the route connection data, a designated network path among a plurality of different available network paths of the data communication network based at least in part on the route connection data to exchange the data between the host computing system and the destination communication device without routing the data through a compromised data node among the plurality of data nodes, wherein the MCR system comprises:
an MCR task controller is in signal communication with the host computing system, the MCR task controller is configured to receive the user request along with one or both of host context information and a task corresponding to the user request; and
an MCR route controller in signal communication with the MCR task controller and the data communications network, the MCR route controller configured to generate the route connection data based on one or both of the host context information and the task,
wherein the MCR task controller receives the route connection data and configures the designated network path among the plurality of different available network paths based on the route connection data, and
wherein data is exchanged between the host computing system and the destination communication device via the designated network path, the destination communication device is located in a geographic location different from the host computing system, and wherein the mission context routing (MCR) system actively monitors one or both of changes in the geographic location of the destination communication device and a current foreign affairs status associated with the geographic location to detect the compromised data node and actively reconfigures data routes of the designated network path to avoid routing the data through the compromised data node.

2. The data communications network of claim 1, wherein the MCR task controller is further configured to analyze the user request to determine a context, and to extract one or more tasks therefrom having attributes selected from the group comprising a host IP address, a destination IP address, an initiation timestamp, a communication protocols, a user ID, and a task ID.

3. The data communications network of claim 2, wherein a database stores the route connection data, the route connection data including a plurality of predefined routing tables that define available network paths of the data communication network, each predefined routing table indexed by a preassigned task ID.

4. The data communications network of claim 3, wherein the MCR route controller receives the task ID, compares the task ID to the plurality of predefined routing tables, and generates the route connection data based on a selected predefined routing table having a predefined task ID that matches the task ID determined by the MCR task controller.

5. The data communications network of claim 4, wherein the host context information corresponds to at least one routing permission that determines access between the host computing system and a communication device in signal communication with the data communication network and located remotely from the host computing system.

6. A mission context routing (MCR) system comprising:
an MCR task controller is in signal communication with a host computing system, the MCR task controller is configured to receive a user request from the host to connect to a data communications network having a plurality of different available network paths, each network path defined by a plurality of data nodes configured to exchange data between the host and a destination communication device, and prior to establishing a designated network path different available network paths determine one or both of host context information and a task corresponding to the user request; and
an MCR route controller in signal communication with the MCR task controller and the data communications network, the MCR route controller, the MCR route controller configured to generate route connection data prior to establishing the designated network path based on one or both of the host context information and the task,
wherein the MCR task controller receives the route connection data and configures the designated network path among the plurality of different available network paths based on the route connection data to exchange the data between the host computing system and the destination communication device without routing the data through a compromised data node among the plurality of data nodes, and
wherein data is exchanged between the host computing system and the destination communication device via the designated network path, the destination communication device located in a geographic location different from the host computing system, and wherein the mission context routing (MCR) system actively monitors one or both of changes in the geographic location of the destination communication device and a current foreign affairs status associated with the geographic location to detect the compromised data node and actively reconfigures data routes of the designated network path to avoid routing the data through the compromised data node.

7. The MCR system of claim 6, wherein the MCR task controller is further configured to analyze the user request to determine a context, and to extract one or more tasks therefrom having attributes selected from the group comprising a host IP address, a destination IP address, an initiation timestamp, a communication protocols, a user ID, and a task ID.

8. The MCR system of claim 7, wherein a database stores the route connection data, the route connection data including a plurality of predefined routing tables that define available network paths of the data communication network, each predefined routing table indexed by a preassigned task ID.

9. The MCR system of claim 8, wherein the MCR route controller receives the task ID, compares the task ID to the plurality of predefined routing tables, and generates the route connection data based on a selected predefined routing table having a predefined task ID that matches the task ID determined by the MCR task controller.

10. The MCR system of claim 6, wherein the host context information corresponds to at least one routing permission that determines access between the host computing system.

11. The MCR system of claim 6, wherein a communication device is in signal communication with the data communication network and is located remotely from the host computing system.

12. The MCR system of claim 11, wherein the designated network path prevents the host computing system from exchanging data with the remotely located communication device.

13. A method of routing data through a data communications network, the method comprising:
receiving, by a MCR task controller, a user request from a host to connect to a data communications network having a plurality of different available network paths, each network path defined by a plurality of data nodes configured to exchange data between the host and a destination communication device;
prior to establishing a designated network path among the different available network paths, determining, by the MCR controller, one or both of a host context information and a task corresponding to the user request;
generating, by an MCR route controller, route connection data based on one or both of the host context information and the task;
receiving, by the MCR task controller, the route connection data and configuring a designated network path among the plurality of different available network paths based on the route connection data to exchange the data between the host computing system and the destination communication device without routing the data through a compromised data node among the plurality of data nodes; and
exchanging data between the host computing system and the destination communication device located at a different geographic location from the host computing system via the designated network path,
wherein the mission context routing (MCR) system actively monitors one or both of changes in the geographic location of the destination communication device and a current foreign affairs status associated with the geographic location to detect the compromised data node and actively reconfigures data routes of the designated network path to avoid routing the data through the compromised data node.

14. The method of claim 13, further comprising:
analyzing, by the MCR task controller the user request to determine a context of the user request; and
extracting, by the MCR task controller, one or more tasks therefrom having attributes selected from the group comprising a host IP address, a destination IP address, an initiation timestamp, a communication protocols, a user ID, and a task ID.

15. The method of claim 14, further comprising:

storing, in a database, the route connection data that includes a plurality of predefined routing tables defining available network paths of the data communication network, each predefined routing table indexed by a preassigned task ID;

receiving, by the MCR route controller, the task ID and comparing the task ID to the plurality of predefined routing tables; and generating, by the MCR route controller, the route connection data based on a selected predefined routing table having a predefined task ID that matches the task ID determined by the MCR task controller.

16. The method of claim 13, further comprising:

assigning at least one routing permission to the host context information;

determining access between the host computing system and the destination communication device in response to analyzing at least one permission assigned to the host context information corresponding to the user request; and in response to the at least one permission denying data access to the destination communication device, configuring the designated network path such that data exchange between the host computing system and the destination communication device is prevented.

* * * * *